(12) United States Patent
Cheon et al.

(10) Patent No.: US 12,309,293 B2
(45) Date of Patent: May 20, 2025

(54) APPARATUS FOR GENERATING BLIND SIGNATURE AND METHOD THEREOF

(71) Applicant: SEOUL NATIONAL UNIVERSITY R&DB FOUNDATION, Seoul (KR)

(72) Inventors: Jung Hee Cheon, Seoul (KR); Hyeongmin Choe, Seoul (KR)

(73) Assignee: SEOUL NATIONAL UNIVERSITY R&DB FOUNDATION, Seoul (KR)

(*) Notice: Subject to any disclaimer, the term of this patent is extended or adjusted under 35 U.S.C. 154(b) by 303 days.

(21) Appl. No.: 18/173,309

(22) Filed: Feb. 23, 2023

(65) Prior Publication Data

US 2023/0291573 A1    Sep. 14, 2023

(30) Foreign Application Priority Data

Feb. 25, 2022  (KR) .................. 10-2022-0025078
Feb. 20, 2023  (KR) .................. 10-2023-0022296

(51) Int. Cl.
*H04L 9/32*  (2006.01)
*H04L 9/00*  (2022.01)

(52) U.S. Cl.
CPC ............ *H04L 9/3257* (2013.01); *H04L 9/008* (2013.01)

(58) Field of Classification Search
CPC ...... H04L 9/3257; H04L 9/008; H04L 9/3247
See application file for complete search history.

(56) References Cited

U.S. PATENT DOCUMENTS

| | | | |
|---|---|---|---|
| 2005/0018851 A1* | 1/2005 | Venkatesan | H04L 9/3257 380/277 |
| 2018/0139054 A1* | 5/2018 | Chu | H04L 9/008 |
| 2021/0334809 A1* | 10/2021 | Zhang | G06Q 20/065 |
| 2022/0182234 A1* | 6/2022 | Bockes | H04L 9/002 |

OTHER PUBLICATIONS

Security of Blind Discrete Log Signatures against Interactive Attacks, by Schnorr, published Jun. 2007 (Year: 2007).*

* cited by examiner

*Primary Examiner* — Vu V Tran
(74) *Attorney, Agent, or Firm* — Steinfl + Bruno LLP

(57) ABSTRACT

An electronic apparatus includes a communication apparatus communicating with an external apparatus, a memory storing a message, and a processor generating a digital signature for the message, wherein the processor generates a first signature ciphertext and a message ciphertext by encrypting each of first signature information and the message by using a homomorphic encryption public key, obtains encrypted third signature information generated using second signature information, an element value corresponding to the second signature information, the first signature ciphertext, and the message ciphertext, and calculates a first digital signature value included in the digital signature by using the first signature information and the second signature information, calculate a second digital signature value included in the digital signature by decrypting the encrypted third signature information, and generate the digital signature by using the calculated first digital signature value and second digital signature value.

15 Claims, 10 Drawing Sheets

FIG. 5

Setup. Gen($1^\lambda$): Upon input the security parameter $\lambda$, do the following:
- Invoke (Sig.sk, Sig.vk) ← Sig.KeyGen($1^\lambda$).
- Set ppk = H'($\alpha$), where $\alpha$ is any arbitrary publicly known value (for e.g. $\alpha = 1^\lambda$).
- Output BS.sk = Sig.sk, BS.vk = {Sig.vk, $\alpha$, ppk}.

Signing. (S(BS.sk), U(BS.vk, $\mu$)):
1. User: Given the key BS.vk = {Sig.vk, $\alpha$, ppk} and a message $\mu$, user U first verifies if ppk = H'($\alpha$) and continues only if the verification passes. It then does the following:
   - It first samples FHE.KeyGen randomness r and an FHE key-pair (pk, sk) = FHE.KeyGen($1^\lambda$; r).
   - It computes $ct_\mu$ = FHE.Enc(pk, $\mu$).
   - It samples a PKE.Enc randomness $r_e$ and computes $ct_{sk}$ = PKE.Enc(ppk, sk; $r_e$).
   - It then generates a NIZK proof $\pi_{sk}$ for the following statement:
     Given pk, ppk, $ct_{sk}$, there exists a tuple (sk, r, $r_e$) such that
     $$(pk, sk) = \text{FHE.KeyGen}(1^\lambda; r) \land ct_{sk} = \text{PKE.Enc}(ppk, sk; r_e). \quad (3.1)$$
   - It sends (pk, $\pi_{sk}$, $ct_\mu$, $ct_{sk}$) to signer S.
2. Signer: Upon receiving (pk, $\pi_{sk}$, $ct_\mu$, $ct_{sk}$), signer S does the following:
   - It verifies $\pi_{sk}$ and outputs $\bot$ if it fails.
   - It samples Sig.Sign randomness $\rho$ and computes a ciphertext $ct_\sigma$ = FHE.Eval(pk, Sig.Sign$_{BS.sk, \rho}$, $ct_\mu$) that decrypts to Sig.Sign(BS.sk, $\mu$; $\rho$).
   - It sends $ct_\sigma$ to user U.
3. User: Upon receiving $ct_\sigma$, user U computes and outputs $\sigma$ = FHE.Dec(sk, $ct_\sigma$).

Verifying. The verifier computes Sig.Verify(BS.vk, $\mu$, $\sigma$) and outputs the result.

FIG. 6

Setup. $\text{Gen}(1^\lambda)$: Upon input the security parameter $\lambda$, do the following:
- Invoke $(\text{Sch.sk}, \text{Sch.vk}) \leftarrow \text{Sch.KeyGen}(1^\lambda)$.
- Set $\text{ppk} = H'(\alpha)$, where $\alpha$ is any arbitrary publicly known value (for e.g. $\alpha = 1^\lambda$).
- Output $\text{BS.sk} = \text{Sch.sk}$, $\text{BS.vk} = \{\text{Sch.vk}, \alpha, \text{ppk}\}$.

Signing. $(S(\text{BS.sk}), U(\text{BS.vk}, \mu))$:
1. User: Given the key BS.vk and a message $\mu$, user U first verifies if $\text{ppk} = H'(\alpha)$ and continues only if the verification passes. It then does the following:
   - It first samples FHE.KeyGen randomness $\rho$ and an FHE key-pair $(\text{hpk}, \text{hsk}) = \text{FHE.KeyGen}(1^\lambda; \rho)$.
   - It then samples a PKE.Enc randomness $r_e$ and computes $ct_{sk} = \text{PKE.Enc}(\text{ppk}, \text{hsk}; r_e)$.
   - It then generates a $\text{NIZK}_{\text{FHE}}$ proof $\pi_{sk}$ for the following statement:
     Given hpk, ppk, $ct_{sk}$, there exists a tuple $(\text{hsk}, \rho, r_e)$ such that
     $$(\text{hpk}, \text{hsk}) = \text{FHE.KeyGen}(1\lambda; \rho) \land \text{ctsk} = \text{PKE.Enc}(\text{ppk}, \text{hsk}; re). \quad (4.1)$$
   - It samples Sch.Sign partial randomness $k_u \leftarrow Z_q^*$ and computes $r_u = g^{k_q}$, $ct_{r_u} = \text{FHE.Enc}(\text{hpk}, r_u)$ and $ct_\mu = \text{FHE.Enc}(\text{hpk}, \mu)$.
   - It computes NIZK proofs $\pi_{r_u}$ and $\pi_\mu$ that $ct_{r_u}$ and $ct_\mu$ are well-formed, using $\text{NIZK}_{ct}$.
   - It sends $(\text{hpk}, ct_{sk}, \pi_{sk}, ct_{r_u}, ct_\mu, \pi_{r_u}, \pi_\mu)$ to signer S.
2. Signer: Upon receiving $(\text{hpk}, ct_{sk}, \pi_{sk}, ct_{r_u}, ct_\mu, \pi_{r_u}, \pi_\mu)$, signer S does the following:
   - It verifies $\pi_{sk}, \pi_{r_u}$ and $\pi_\mu$ and outputs $\bot$ if any of these fails.
   - It samples Sch.Sign partial randomness $k_s \leftarrow Z_q$ and computes $\text{Sch.Sign}^f(ks)$, i.e. $r_s = g^{k_s}$; it then generates a $\text{NIZKAoK}_{DL}$ proof $\pi_{k_s}$ that $r_s$ is well-formed with respect to $k_s$, i.e., there exists $k_s$ such that $r_s = g^{k_s}$.
   - It computes a ciphertext $ct_s = \text{FHE.Eval}(\text{hpk}, C_{\text{BS.sk},k_s}, ct_\mu, ct_{r_u})$, which returns the encryption of $k_s + \text{BS.sk} \cdot H(\mu, r_u \cdot g^{k_s})$.
   - It sends $ct_s, r_s, \pi_{k_s}$ to user U.
3. User: Upon receiving $ct_s, r_s, \pi_{k_s}$, user U does the following:
   - It first verifies $\pi_{k_s}$ and outputs $\bot$ if it fails.
   - It computes $r = g^{k_u} \cdot r_s$ and $s = \text{FHE.Dec}(\text{hsk}, ct_s)$.
   - It computes $\text{Sch.Verify}(\text{BS.vk}, \mu, (r, k_u + s))$ and outputs $\bot$ if it fails.
   - It outputs $\sigma = (r, k_u + s)$.

Verifying. The verifier computes $\text{Sch.Verify}(\text{BS.vk}, \mu, \sigma = (r, k_u + s))$ and outputs the result.

FIG. 7

Setup. $Gen(1^\lambda)$: Upon input the security parameter $\lambda$, do the following:
- Invoke division-free Schnorr DFSch.sk Setup, resulting a group $G = \langle P \rangle$ on an Edwards curve $E(F_{2^d})$.
- Invoke $(DFSch.sk, DFSch.vk) \leftarrow DFSch.KeyGen(1^\lambda)$.
- Set $ppk = H'(\alpha)$, where $\alpha \in \{0, 1\}^\lambda$ is any arbitrary publicly known value (for e.g. $\alpha = 1^\lambda$).
- Output $BS.sk = DFSch.sk$, $BS.vk = \{DFSch.vk, \alpha, ppk\}$.

Signing. $\langle S(BS.sk), U(BS.vk, \mu) \rangle$:
1. User: Given the key BS.vk and a message $\mu$, user U first verifies if $ppk = H'(\alpha)$ and continues only if the verification passes. It then does the following:
   - It first samples FHE.KeyGen randomness $\rho$ and an FHE key-pair $(hpk, hsk) = FHE.KeyGen(1^\lambda; \rho)$
   - It then samples a PKE.Enc randomness $r_e$ and computes $ct_{sk} = PKE.Enc(ppk, hsk; r_e)$.
   - It then generates a NIZKFHE proof $\pi_{sk}$ for the following statement:
     Given pk, ppk, $ct_{sk}$, there exists a tuple $(hsk, \rho, r_e)$ such that
     $$(hpk, hsk) = FHE.KeyGen(1^\lambda; \rho) \wedge ct_{sk} = PKE.Enc(ppk, hsk; r_e). \quad (5.1)$$
   - It randomly chooses $k_u \in Z_q$, computes $(x_u, y_u) = R_u = [k_u]P$.
   - It encrypts $x_u$, $y_u$ and $\mu$ to $ct_{x_u}$, $ct_{y_u}$ and $ct_\mu$ with the proofs on the well-formedness of the ciphertexts.
   - It sends hpk, $ct_{sk}$ with it's proof and ciphertexts with the proofs to signer S.
2. Signer: Upon receiving $(hpk, ct_{sk}, \pi_{sk}, ct_{x_u}, ct_{y_u}, ct_\mu, \pi_{x_u}, \pi_{y_u}, \pi_\mu)$, signer S does the following:
   - It verifies $\pi_{sk}$, $\pi_{x_u}$, $\pi_{y_u}$ and $\pi_\mu$ and outputs $\perp$ if any of these fails.
   - It samples a partial randomness $k_s \leftarrow Z_q$ and computes the projective coordinate $X_s$, $Y_s$ and $Z_s$ such that $[X_s; Y_s; Z_s] = R_s = g^{k_s}$ and randomize by multiplying $\epsilon \leftarrow F_{2^d}$. It generates a $NIZKAoK_{DL}$ proof $\pi_{k_s}$ that it knows the discrete log of $R_s = (X_s/Z_s, Y_s/Z_s)$.
   - It computes $(ct_X, ct_Y, ct_Z) \leftarrow FHE.Eval(EC.Add_{X_s,Y_s,Z_s}, (ct_{x_u}, ct_{y_u}))$ and computes $ct_s = FHE.Eval(C^{DFSch}_{BS.sk, k_s}, (ct_\mu, ct_X, ct_Y, ct_Z))$.
   - It sends $X_s$, $Y_s$, $Z_s$ with the proof and $ct_s$ to user U.
3. User: Upon receiving $ct_s$, $X_s$, $Y_s$, $Z_s$, $\pi_{k_s}$, user U does the following:
   - It first verifies $\pi_{k_s}$ and outputs $\perp$ if it fails.
   - It verifies $(X_s/Z_s, Y_s/Z_s) \in G$ and outputs $\perp$ if it fails.
   - It computes $(X, Y, Z) = EC.Add_{X_s,Y_s,Z_s}(x_u, y_u)$ and $s = FHE.Dec(hsk, ct_s)$.
   - It verifies the DFSch signature $\sigma = (X, Y, Z, k_u + s)$ and outputs $\perp$ if it fails.
   - It outputs $\sigma$.

Verifying. The verifier computes $DFSch.Verify(BS.vk, \mu, \sigma)$ and outputs the result.

APPARATUS FOR GENERATING BLIND SIGNATURE AND METHOD THEREOF

TECHNICAL FIELD

Apparatuses and methods consistent with the disclosure relate to an apparatus for generating a blind signature and a method thereof, and more particularly, to an apparatus for generating a blind signature which may generate a blind signature for data encrypted by a homomorphic encryption method, and a method thereof.

BACKGROUND ART

Various services for transmitting and receiving data between various apparatuses are supported in accordance with the development of electronic and communication technologies. In a field of internet banking or the like among these various services, there is a need for a process of verifying that a corresponding message has not been forged or falsified during message transmission and reception, and this process may be referred to as a digital signature.

This digital signature may be data in an electronic form mediated by a computer, and used to verify the identity of a signer and express the signer's approval on a content of a data message. The digital signature may be divided into an operation of generating a signature key and a verification key, a signature operation of signing the message to be transmitted, and an operation of verifying authenticity of the message and signature.

However, the digital signature does not encrypt the message itself, and a third party may thus verify the message. That is, the reason is that the digital signature may only prove the fact that a person written as an author wrote an electronic document and that a written content was not forged or falsified in the transmission/reception process.

Accordingly, as information security is recently required, there is a need for a method using a blind signature in which anonymity is added to the digital signature.

SUMMARY

The disclosure provides an apparatus for generating a blind signature which may generate a blind signature for data encrypted by a homomorphic encryption method, and a method thereof.

According to an embodiment of the disclosure, a method of generating a digital signature includes: generating a first signature ciphertext and a message ciphertext by encrypting each of first signature information and a message by using a homomorphic encryption public key, obtaining encrypted third signature information generated using second signature information, an element value corresponding to the second signature information, the first signature ciphertext, and the message ciphertext, and calculating a first digital signature value included in the digital signature by using the first signature information and the second signature information, calculating a second digital signature value included in the digital signature by decrypting the encrypted third signature information, and generating the digital signature by using the calculated first digital signature value and second digital signature value.

In the obtaining of the signature information, the first signature ciphertext and the message ciphertext may be transmitted to an external apparatus having a signature key for the digital signature, and the second signature information and the encrypted third signature information may be received from the external apparatus.

The method may further include generating first signature verification information corresponding to the first signature information and message verification information corresponding to the message ciphertext, wherein in the obtaining of the signature information, the first signature ciphertext, the message ciphertext, the first signature verification information, and the message verification information are transmitted to the external apparatus.

The method may further include: generating a secret key ciphertext by extracting a random value, and encrypting the extracted random value by using a homomorphic encryption secret key corresponding to the homomorphic encryption public key, and generating secret key verification information corresponding to the secret key ciphertext, wherein in the obtaining of the signature information, the secret key ciphertext and the secret key verification information are further transmitted.

The signature key may include the signature information, the random value of the signature, and a hashed value obtained by hashing the random value of the signature, and the secret key ciphertext may be obtained by encrypting the extracted random value by using the hashed value and the homomorphic encryption secret key.

The signature key may be an element value sch.sk randomly extracted from a set $\mathbb{Z}_p^*$, and a verification key may include an element value $g^{sch.sk}$ of a group G, the random value of the signature, and the hashed value, based on the extracted element sch.sk.

The first signature information may be information $g^{k_u}$ calculated using an element value $k_u$ randomly extracted from a set $\mathbb{Z}_p^*$ by an electronic apparatus, the second signature information may be information $g^{k_s}$ calculated using an element value $k_s$ randomly extracted from the set $\mathbb{Z}_p^*$ by an external apparatus, and in the generating of the digital signature, the first digital signature value may be calculated by multiplying the first signature information $g^{k_u}$ and the second signature information $g^{k_s}$, and the second digital signature value may be calculated by decrypting the encrypted third signature information by using a homomorphic encryption secret key corresponding to the homomorphic encryption public key.

In the generating of the digital signature, a second digital signature value $k_u+s$ may be calculated by adding decrypted third signature information s and the extracted element value $k_u$.

The method may further include randomly extracting an element value $k_u$ from a set $\mathbb{Z}_p$, generating a first element value $x_u$ and a second element value $y_u$, obtained by decomposing the element value, and generating a first ciphertext for the first element value and a second ciphertext for the second element value.

According to another embodiment of the disclosure, an electronic apparatus includes: a communication apparatus communicating with an external apparatus; a memory storing a message; and a processor generating a digital signature for the message, wherein the processor generates a first signature ciphertext and a message ciphertext by encrypting each of first signature information and the message by using a homomorphic encryption public key, obtains encrypted third signature information generated using second signature information, an element value corresponding to the second signature information, the first signature ciphertext, and the message ciphertext, and calculates a first digital signature value included in the digital signature by using the first signature information and the second signature information, calculate a second digital signature value included in the digital signature by decrypting the encrypted third signature information, and generate the digital signature by using the calculated first digital signature value and second digital signature value.

The processor may control the communication apparatus to transmit the first signature ciphertext and the message ciphertext to the external apparatus having a signature key for the digital signature, and the communication apparatus may receive the second signature information and the encrypted third signature information from the external apparatus.

The processor may generate first signature verification information corresponding to the first signature information and message verification information corresponding to the message ciphertext, and control the communication apparatus to transmit, to the external apparatus, the first signature ciphertext, the message ciphertext, the first signature verification information, and the message verification information.

The processor may generate a secret key ciphertext by extracting a random value, and encrypting the extracted random value by using a homomorphic encryption secret key corresponding to the homomorphic encryption public key, and generate secret key verification information corresponding to the secret key ciphertext.

The processor may control the communication apparatus to further transmit the secret key ciphertext and the secret key verification information.

The signature key may include the signature information, the random value of the signature, and a hashed value obtained by hashing the random value of the signature, and the secret key ciphertext may be obtained by encrypting the extracted random value by using the hashed value and the homomorphic encryption secret key.

According to still another embodiment of the disclosure, a non-transitory computer-readable recording medium which stores a program for executing a method of generating a digital signature, wherein the method includes: generating a first signature ciphertext and a message ciphertext by encrypting each of first signature information and a message by using a homomorphic encryption public key, obtaining encrypted third signature information generated using second signature information, an element value corresponding to the second signature information, the first signature ciphertext, and the message ciphertext, and calculating a first digital signature value included in the digital signature by using the first signature information and the second signature information, calculating a second digital signature value included in the digital signature by decrypting the encrypted third signature information, and generating the digital signature by using the calculated first digital signature value and second digital signature value.

According to the various embodiments of the disclosure as described above, the message may secure confidentiality because the message is processed while being homomorphically encrypted in case of generating the signature.

BRIEF DESCRIPTION OF THE DRAWINGS

FIG. 5 is a view for explaining a method of generating a blind signature according to a first embodiment of the disclosure.

FIG. 6 is a view for explaining a method of generating a blind signature according to a second embodiment of the disclosure.

FIG. 7 is a view for explaining a method of generating a blind signature according to a third embodiment of the disclosure.

DETAILED DESCRIPTION

Hereinafter, the disclosure is described in detail with reference to the accompanying drawings. Encryption/decryption may be applied as necessary to a process of transmitting information (or data) that is performed in this specification, and an expression describing the process of transmitting the information (or data) in this specification and the claims should be interpreted as including cases of the encryption/decryption even if not separately mentioned. In this specification, an expression such as "transmission/transfer from A to B" or "reception from A to B" may include transmission/transfer or reception while having another medium included in the middle, and may not necessarily express only the direct transmission/transfer or reception from A to B.

In describing the disclosure, a sequence of each operation should be understood as non-restrictive unless a preceding operation in the sequence of each operation needs to logically and temporally precede a subsequent operation. That is, except for the above exceptional case, the essence of the disclosure is not affected even though a process described as the subsequent operation is performed before a process described as the preceding operation, and the scope of the disclosure should also be defined regardless of the sequence of the operations. In addition, in this specification, "A or B" may be defined to indicate not only selectively indicating either one of A and B, but also including both A and B. Meanwhile, in this specification, a term "including" may have a meaning encompassing further including other elements in addition to elements listed as being included.

This specification only describes essential components necessary for describing the disclosure, and does not mention components unrelated to the essence of the disclosure. In addition, it should not be interpreted as an exclusive meaning that the disclosure includes only the mentioned components, but should be interpreted as a non-exclusive meaning that the disclosure may include other components as well.

Mathematical operations and calculations of each step in the disclosure described below may be implemented as computer operations by a known coding method or coding designed to be suitable for the disclosure to perform the corresponding operations or calculations.

Specific equations described below are exemplarily described among possible alternatives, and the scope of the disclosure should not be construed as being limited to the equations mentioned in this specification.

Hereinafter, various embodiments of the disclosure are described in detail with reference to the accompanying drawings.

Figure 1:
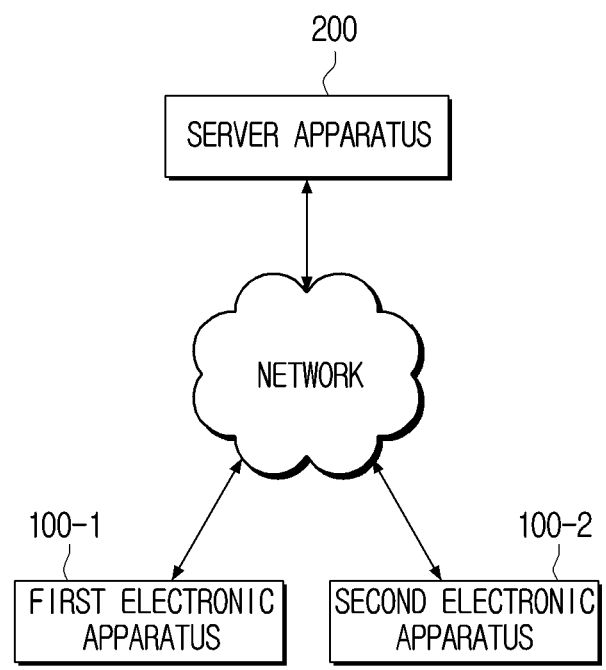
FIG. 1 is a view for explaining a structure of a network system according to an embodiment of the disclosure.

FIG. 1 is a view for explaining a structure of a network system according to an embodiment of the disclosure.

Referring to FIG. 1, the network system may include a network, a plurality of electronic apparatuses 100-1 and 100-2, and a server apparatus 200.

The electronic apparatuses 100-1 and 100-2 may be implemented in various types of apparatuses such as a smart phone, a tablet, a game player, a personal computer (PC), a laptop PC, a home server, a kiosk, or the like, and may also be implemented in other types of home appliances each having an internet of things (IoT) function.

The first electronic apparatus 100-1 may generate various keys necessary for a digital signature. In detail, the first electronic apparatus 100-1 may perform a key generation algorithm, and generate a signature key necessary for a digital signature process and a verification key necessary for its verification. Here, the key generation algorithm may be an algorithm for generating the signature key and the verification key, such as a Schnorr signature.

Meanwhile, the verification key generated by the first electronic apparatus 100-1 may be provided to the server apparatus 200 or the like through the network. Here, the signature key may be a key used in performing the signature on a message, and also be referred to as a secret key. In addition, the verification key may be a key used in case of verifying the generated signature and referred to as a public key.

In addition, the first electronic apparatus 100-1 may generate the secret key (or homomorphic encryption secret key) and the public key (or homomorphic encryption public key) necessary for homomorphic encryption of the message. In addition, the second electronic apparatus 100-2 may encrypt the message by using the generated public key. Meanwhile, the second electronic apparatus 100-2 may be implemented to generate and use the homomorphic encryption secret key and the homomorphic encryption public key.

In addition, the first electronic apparatus 100-1 may generate the digital signature for the message. Meanwhile, the first electronic apparatus 100-1 may generate the digital signature for the message that is stored on its own or the digital signature for that message that is stored in another apparatus.

Hereinafter, for ease of explanation, it is assumed that the first electronic apparatus 100-1 stores the message, and the second electronic apparatus 100-2 performs a signature operation (in detail, the second electronic apparatus 100-2 performs some processes of the signature operation, and the first electronic apparatus 100-1 generates a final digital signature). That is, the description describes a method of performing the signature operation while the second electronic apparatus 100-2 does not know a content of the message. Meanwhile, the second electronic apparatus 100-2 may also be implemented to store the message, and generate the final digital signature for the message by a linked operation of the first electronic apparatus 100-1.

In detail, the first electronic apparatus 100-1 may encrypt the message and provide the encrypted message and various types of information necessary for the signature of the message to the second electronic apparatus 100-2.

The second electronic apparatus 100-2 receiving the encrypted message may generate the encrypted digital signature by using the encrypted message. The second electronic apparatus 100-2 may then provide the encrypted message to the first electronic apparatus 100-1.

In case of receiving the encrypted digital signature, the first electronic apparatus 100-1 may decrypt the received encrypted digital signature by using the secret key (in detail, homomorphic encryption secret key) to generate the digital signature for the message.

The first electronic apparatus 100-1 may then transmit the message and the digital signature for the corresponding message to the server apparatus 200.

The first electronic apparatus 100-1 and the second electronic apparatus 100-2 may be connected to each other through the network. Here, the networks may be implemented in various types of wired and wireless communication networks, broadcast communication networks, optical communication networks, cloud networks, or the like, and the respective apparatuses may be connected to each other in a way such as wireless-fidelity (Wi-Fi), Bluetooth, near field communication (NFC), or the like without a separate medium.

The server apparatus 200 may receive the digital signature generated by the second electronic apparatus 100-2, and perform a verification operation on the received digital signature. In detail, the server apparatus 200 may verify authenticity of the digital signature message and the signature by using the verification key generated by the first electronic apparatus 100-1.

Although FIG. 1 shows the plurality of electronic apparatuses 100-1 and 100-2, the plurality of electronic apparatuses are not necessarily used, and one electronic apparatus may be used. For example, one electronic apparatus may perform an operation of generating the secret key and the verification key and an operation of generating the signature for the message.

In the above embodiment, although the description describes that the first electronic apparatus 100-1 generates the secret key and the verification key, the electronic apparatus 100-2 other than the first electronic apparatus 100-1 or the server apparatus 200 may also be implemented to generate at least one of the secret key or the verification key, and then share the same with another electronic apparatus.

As described above, the network system according to this embodiment may perform the homomorphic encryption on the message in a process of digital signature, and prevent the content of the message from being disclosed to an external apparatus.

Figure 2:
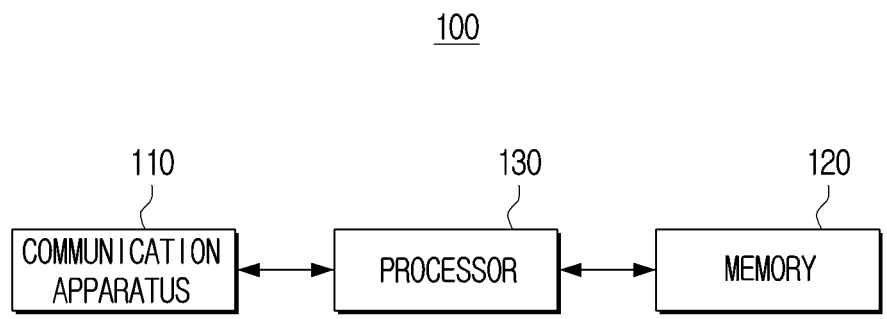
FIG. 2 is a block diagram showing a simple configuration of an electronic apparatus according to an embodiment of the disclosure.

FIG. 2 is a block diagram showing a simple configuration of an electronic apparatus according to an embodiment of the disclosure.

Referring to FIG. 2, an electronic apparatus 100 may include a communication apparatus 110, a memory 120, and a processor 130. The electronic apparatus 100 of FIG. 2 may be operated as the first electronic apparatus 100-1 of FIG. 1 and also be operated as the second electronic apparatus 100-2 of FIG. 1. Meanwhile, the electronic apparatus 100 of FIG. 2 may perform the operation of the server apparatus 200 of FIG. 1, that is, the verification operation. Hereinafter, although it is assumed that the electronic apparatus 100 may perform both the operations of the first and second electronic apparatuses, the electronic apparatus 100 may be implemented to perform only one operation.

The communication apparatus 110 may connect the electronic apparatus 100 to the external apparatus (not shown), and may be connected to the external apparatus through a local area network (LAN) or an internet network, or through a universal serial bus (USB) port or a wireless communication (e.g., wireless fidelity (Wi-Fi) 802.11a/b/g/n, near field communication (NFC), or Bluetooth) port. The communication apparatus 110 may also be referred to as a transceiver.

The communication apparatus 110 may receive the signature key from the external apparatus, and transmit the signature key or the verification key that is generated by the electronic apparatus 100 to the external apparatus. Here, a signature key x may be a key used to perform the signature, and a verification key y may be a key used to verify the signature. Here, a signature key BS.sk may be a random element extracted from a set $Z_P^*$, and a verification key BS.vk may be an element of a group G. That is, the verification key may be an element of a group (or set) having a prime order. In addition, the verification key may include not only the element of the group G described above, but also include a random value and a hashed value for the random value.

In addition, the communication apparatus 110 may receive various information necessary for the signature process from the external apparatus or transmit various information generated by the electronic apparatus 100 to the external apparatus. For example, the various information described above may include a message ciphertext, a public key ciphertext, a secret key ciphertext, secret key verification information, public key verification information, message verification information, or the like, and further use additional information based on a method described below.

Here, the homomorphic encryption secret key may be a secret key used for the homomorphic encryption, and may be a value calculated from a ring which is a closed set for addition and multiplication and in which addition and multiplication are defined between the elements. In this way, in the disclosure, the message may be encrypted by the homomorphic encryption method and then transmitted to the external apparatus, thus obtaining the same result as that obtained by directly performing the same operation on the message even though various arithmetic operations such as addition and multiplication are performed by the external apparatus. Meanwhile, finite fields of various sizes may be used in the disclosure. The description describes an embodiment in which the finite fields of various sizes are used below with reference to FIG. 7.

In addition, the communication apparatus 110 may transmit or receive encrypted signature information. Meanwhile, the communication apparatus 110 may transmit and receive the finally-generated signature information to and from the external apparatus.

In addition, the communication apparatus 110 may receive the message from the external apparatus and may transmit the message or the like to the external apparatus.

Meanwhile, the communication apparatus 110 may receive various parameters necessary for generating the ciphertext from the external apparatus. Meanwhile, the various parameters may be implemented to be directly input from a user through a manipulation input apparatus 150 described below. For example, the above parameters may be a security parameter λ, a daps boundary d, etc. Here, the security parameters may be used to generate the secret key and verification key for the signature. Here, the daps boundaries may be used for generating the homomorphic encryption public key and the homomorphic encryption secret key.

The memory 120 is a component storing an operating system (O/S), various software, data, and the like for driving the electronic apparatus 100. The memory 120 may be implemented in various forms such as a random access memory (RAM), read-only memory (ROM), a flash memory, a hard disk drive (HDD), an external memory, and a memory card, and is not limited to any one of these forms.

The memory 120 may store the message. Here, the message may be various credit information, personal information or the like, cited by the user, and may be information related to a use history such as location information or internet use time information, used by the electronic apparatus 100.

In addition, the memory 120 may store the verification key, and may store not only the signature key, but also the various parameters necessary for generating the verification key and the signature key in case that the electronic apparatus 100 directly generates the verification key.

Meanwhile, the memory 120 may temporarily store values generated in an operation process, and store a finally-generated signature.

The processor 130 may control each component in the electronic apparatus 100. The processor 130 may be a single apparatus such as a central processing unit (CPU), or may include a plurality of apparatuses such as a clock generator circuit, the CPU, and a graphic processor.

Meanwhile, the digital signature may be divided into an operation of generating the key, an operation of generating the digital signature, and a determination operation. The description first describes a content related to the operation of generating the key.

The processor 130 may generate the signature key BS.sk and the verification key BS.vk necessary for the digital signature by executing a program stored in the memory 120. In detail, the processor 130 may extract the random element (or the signature key) from the set $\mathbb{Z}_p^*$. In addition, the processor 130 may generate the verification key that is an element g of the group G based on the extracted element. Here, the processor 130 may generate not only the verification key but also the verification key also including a random value a and a hashed value ppk=H'(α) for the corresponding random value, based on only the element of the group G described above.

Meanwhile, the signature key and verification key described above may be generated using a key generation method of a Schnorr signature scheme, or a key generation method of a division-free Schnorr scheme.

Hereinafter, the description describes the operation of generating the digital signature. First, the description describes an operation of the electronic apparatus 100 storing the message. Meanwhile, although the disclosure separately describes an apparatus that owns the message and an apparatus that performs the signature, one apparatus may be implemented to have the message and generate the signature.

In case of receiving a request for initiation of a signature protocol, the processor 130 may first verify the verification key. In detail, the processor 130 may hash-process the random value included in the verification key, and determine whether the corresponding hashed value is the same as the hashed value included in the verification key.

In addition, the processor 130 may generate the homomorphic encryption secret key and the homomorphic encryption public key. Meanwhile, the homomorphic encryption secret key and the homomorphic encryption public key used may here be generated in advance, or may be generated by another apparatus and provided to the electronic apparatus 100.

In addition, in case that the homomorphic encryption secret key is prepared, the processor 130 may perform the homomorphic encryption on the homomorphic encryption secret key. In detail, the processor 130 may generate the random value, and homomorphically encrypt the generated random value by using the homomorphic encryption secret key. Here, the processor 130 may generate the encrypted secret key by encrypting the above-mentioned random value by using the hashed value included in the verification key as the secret key together with the homomorphic encryption secret key. Meanwhile, although the disclosure describes the above process as an encryption process, the process may also be referred to as an encoding operation.

In addition, the processor 130 may generate the verification information for the generated encrypted secret key. In detail, the processor 130 may generate the verification information to be used for verification using a zero-knowledge proof method. The description describes below a detailed operation using the zero-knowledge proof method.

In addition, the processor 130 may generate various information (e.g., $k_u$ or $r_u$) necessary for generating a signature value of the Schnorr signature scheme. Here, the first signature information $r_u$ may be an element value $g^{ku}$ of the group G based on $k_u$, and $k_u$ may be an element value randomly extracted from the set $\mathbb{Z}_p^*$.

In addition, the processor 130 may generate a first signature information ciphertext and the message ciphertext by using the homomorphic encryption public key for each of the first signature information $r_u$ and the message.

Meanwhile, the processor 130 may generate the verification information for each of the above-mentioned first signature information ciphertext and the message ciphertext. In detail, the above-mentioned verification information may be information using the zero-knowledge proof method as described above.

In addition, the processor 130 may control the communication apparatus 110 to transmit the previously generated information to the apparatus that performs the signature. In detail, the processor 130 may control the communication apparatus 110 to transmit the homomorphic encryption public key, the first signature information ciphertext, and the message ciphertext. Meanwhile, in case of performing the verification operation in the signature process, the processor 130 may control the communication apparatus 110 to transmit the verification information for each ciphertext together with the above-described information, and further transmit the secret key ciphertext and the verification information therefor. That is, the processor 130 may control the communication apparatus 110 to transmit information necessary for a method corresponding to a signature algorithm described below. For example, the verification information described above may also be implemented not to be provided unless a separate verification operation is not performed in a signature algorithm process.

The apparatus that performs the signature may generate the encrypted signature information by the transmission of such information, and transmit the corresponding signature information to the electronic apparatus 100. In case of receiving the encrypted signature information through this process, the processor 130 may decrypt the encrypted signature information and generate the digital signature by using decrypted information.

Hereinafter, the description describes an operation of the electronic apparatus 100 in a case where the electronic apparatus has no message and performs the signature.

In case of receiving the information (e.g., encrypted message) necessary for the signature, the processor 130 may generate information (e.g., $k_s$ or $r_s$) necessary for the Schnorr signature scheme, and perform a homomorphic encryption operation method to generate the encrypted signature information.

In addition, the processor 130 may control the communication apparatus 110 to provide the encrypted signature information and the second signature information $r_s$ to the electronic apparatus having the message. Here, the processor 130 may control the communication apparatus 110 to also generate the verification information for the second signature information and provide the same to the electronic apparatus having the message.

Meanwhile, in case of receiving the verification information together with the necessary information, the processor 130 may verify the corresponding necessary information by using the verification information and the necessary information. For example, in case of receiving the message ciphertext and the message verification information, the processor 130 may verify whether the message ciphertext is modified by using the corresponding verification information.

Meanwhile, in case of performing the verification, the electronic apparatus 100 may obtain the digital signature, and verify the message by using the obtained digital signature.

Meanwhile, the above description shows and describes only a simple configuration of the electronic apparatus 100, and the electronic apparatus 100 may be implemented to further include various configurations. A description thereof is provided below with reference to FIG. 3.

Meanwhile, referring to FIG. 2, the description describes the operation of the electronic apparatus that corresponds to the digital signature algorithm described below and corresponding to FIG. 5. However, the electronic apparatus 100 may also perform an operation corresponding to an algorithm corresponding to FIG. 6 or 7.

Figure 3:
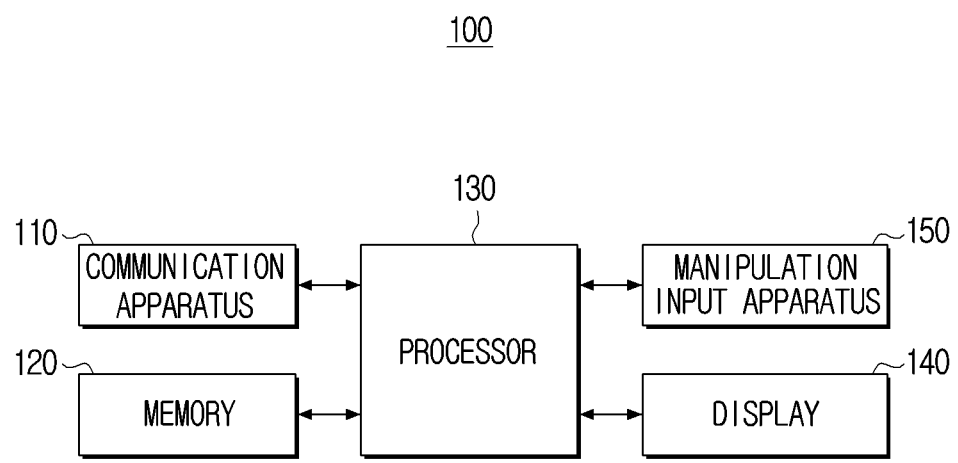
FIG. 3 is a block diagram showing a specific configuration of the electronic apparatus according to an embodiment of the disclosure.

FIG. 3 is a block diagram showing a specific configuration of the electronic apparatus according to an embodiment of the disclosure.

Referring to FIG. 3, the electronic apparatus 100 of the disclosure may include the memory 120, the processor 130, the communication apparatus 110, a display 140, and the manipulation input apparatus 150.

The communication apparatus 110 and the memory 120 are already described with reference to FIG. 2, and the description thus omits redundant descriptions thereof. In addition, the processor 130 is also already described with reference to FIG. 2, and the description thus omits a redundant description thereof provided with reference to FIG. 2, and describes below only an added component in FIG. 3.

The display 140 may display a user interface window for selection of a function supported by the electronic apparatus 100. In detail, the display 140 may display the user interface window for selection of various functions provided by the electronic apparatus 100. The display 140 may be a monitor such as a liquid crystal display (LCD), a cathode ray tube (CRT), or an organic light-emitting diode (OLED), and implemented as a touch screen which may simultaneously perform functions of the manipulation input apparatus 150 described below.

The display 140 may display a message requesting input of the parameter necessary for generating the homomorphic encryption secret key. In addition, the display 140 may display a message in which an encryption target selects a message. Meanwhile, the encryption target may be implemented to be directly selected by the user or automatically selected. That is, the personal information that requires the encryption may be automatically set up even though the user does not directly select the message.

The manipulation input apparatus 150 may receive, from the user, selection of a function of the electronic apparatus 100 and a control command for the corresponding function. In detail, the manipulation input apparatus 150 may receive the parameter necessary for generating the homomorphic encryption secret key from the user. Meanwhile, the message to be encrypted from the user may be set up in the manipulation input apparatus 150.

In case of receiving the parameter necessary for the homomorphic encryption secret key from the user, the processor 130 may generate a set up parameter based on the input parameter, and generate the homomorphic encryption secret key based on the generated set up parameter.

In addition, in case of requiring the digital signature for the message, the processor 130 may generate the digital signature through cooperation with the external apparatus through the above-described process.

As described above, the electronic apparatus 100 according to this embodiment may proceed with the digital signature through the cooperation with the external apparatus by performing the homomorphic encryption of the message, thereby preventing the content of the message from being disclosed to the external apparatus.

Figure 4:
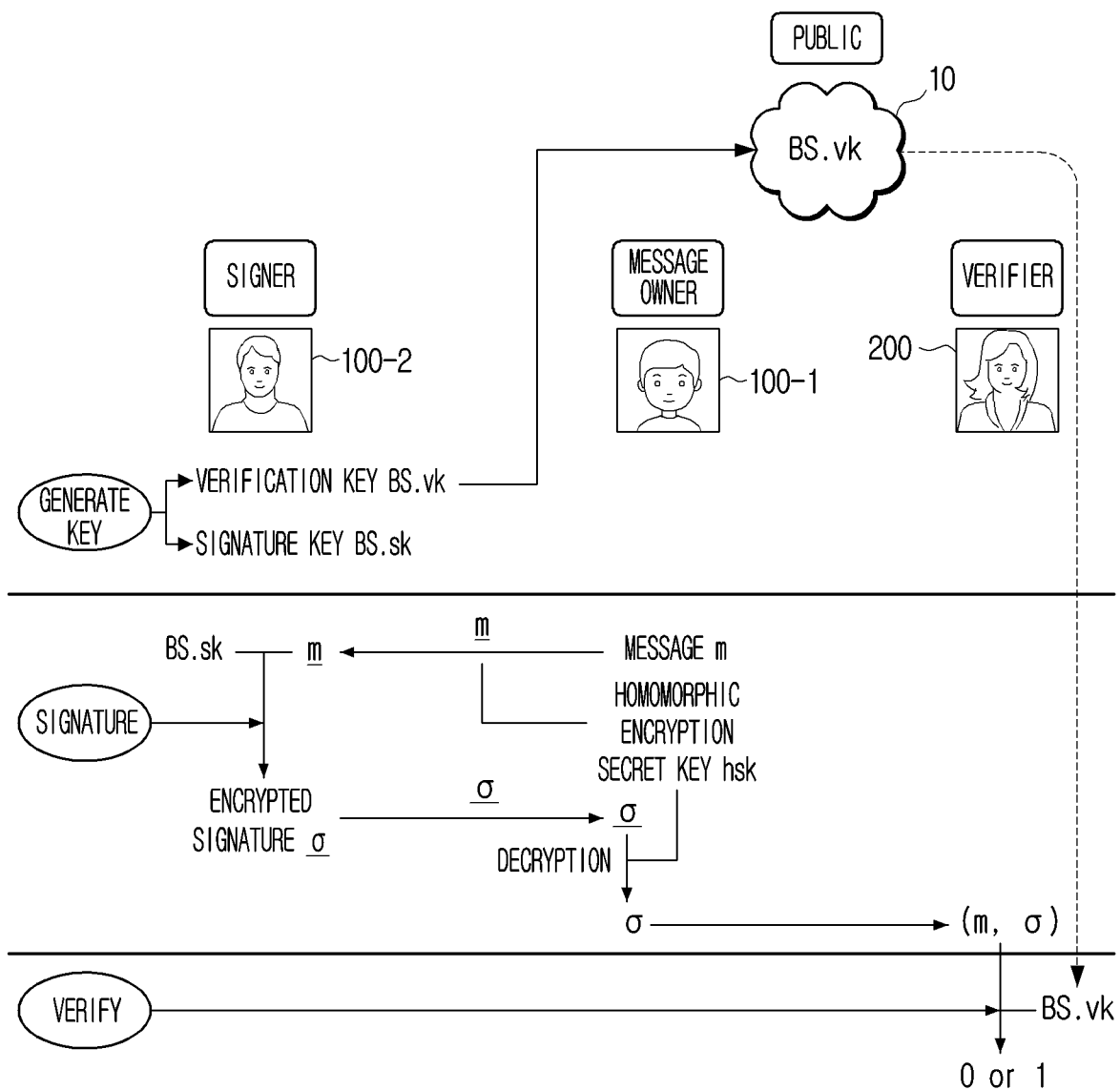
FIG. 4 is a view for explaining an operation of generating a digital signature according to the disclosure.

FIG. 4 is a view for explaining an operation of generating the digital signature according to the disclosure.

First, the description describes the key generation algorithm.

Referring to FIG. 4, the first electronic apparatus 100-1 as the signer may generate the signature key BS.sk and the verification key BS.vk that are necessary for the digital signature. In detail, the first electronic apparatus 100-1 may extract a random element x (BS.sk) from the set $\mathbb{Z}_p^*$, and generate the verification key BS.vk, which is the element $g^{sch.sk}$ of the group G, based on the extracted element. Here, the verification key BS.vk may further include the random value and the hashed value for the random value.

Here, the first electronic apparatus 100-1 may disclose the generated verification key BS.vk through the network. Meanwhile, it is assumed hereinafter that only the first electronic apparatus 100-1 stores the above-described signature key BS.sk, and the message is stored only in the second electronic apparatus 100-2.

Hereinafter, the description describes a signature protocol operation. In detail, the signature key may be not stored in the second electronic apparatus 100-2 as described above, cooperation of the first electronic apparatus 100-1 may thus be required for the digital signature. The second electronic apparatus 100-2 may be implemented to transmit the message to the first electronic apparatus 100-1 and generate the digital signature by using the message received from the first electronic apparatus 100-1.

However, in the case of performing this method, the message may be exposed to the first electronic apparatus 100-1. Therefore, in the disclosure, in order to make the message secret, the second electronic apparatus 100-2 may homomorphically encrypt the message and provide the homomorphic message to the first electronic apparatus 100-1.

In detail, the second electronic apparatus 100-2 may encrypt the message by using the homomorphic encryption public key hpk, and provide the same to the first electronic apparatus 100-1. Here, the homomorphic encryption public key hpk is the public key corresponding to the homomorphic encryption secret key.

The second electronic apparatus 100-2 may verify the verification key in advance before performing the above-described encryption operation. Meanwhile, the verification information corresponding to each transmitted information may be transmitted together to prevent data from being falsified in its transmission/reception process between the first electronic apparatus 100-1 and the second electronic apparatus 100-2 described above. In addition, the first electronic apparatus 100-1 may perform the digital signature by receiving the encrypted message rather than by receiving the message. Therefore, the second electronic apparatus 100-1 may provide additional information necessary for generating the digital signature to the first electronic apparatus 100-1. Here, the additional information may be information on the digital signature generated by the second electronic apparatus 100-2 or information obtained by encrypting the specific random value by using the homomorphic encryption secret key (or the encrypted secret key and its hashed value).

The first electronic apparatus 100-1 may generate an encrypted signature σ by using the provided encrypted message and signature key BS.sk, and transmit the generated encrypted signature σ to the second electronic apparatus 100-2. The description describes a detailed operation of generating the encrypted signature with reference to FIGS. 5 to 7.

In case of receiving the provided encrypted signature σ, the second electronic apparatus 100-2 may decrypt the received encrypted signature by using the homomorphic encryption secret key hsk, and generate the digital signature σ by using the digital signature information or the like used in the previous process. The description describes a more detailed signature protocol operation of the first and second electronic apparatuses 100-1 and 100-2 below with reference to FIG. 5.

Hereinafter, the verification operation may be described as an operation of the server apparatus 200, which is a verification apparatus, verifying the authenticity by using the provided digital signature and the disclosed verification key BS.vk. In detail, the server apparatus 200 may compute Equation 1 below in the same way as the existing Schnorr signature, and verify whether e=H(m,r) to output 1 if correct, and zero if not.

$$g^s = r \cdot \text{Sch.vk}^{H(\mu,r)} \quad \text{[Equation 1]}$$

Here, g is an element of the group G, s is a value included in the digital signature σ=(r, s), Sch.vk is the verification key, r is a value included in the digital signature, and μ is the message.

FIG. 5 is a view for explaining a method of generating a blind signature according to a first embodiment of the disclosure.

First, the description describes a setup operation.

First, a signature key sch.sk and a verification key sch.vk may be generated using a key generation algorithm used in a Schnorr signature scheme. In detail, a random element sch.sk may be extracted from a set $\mathbb{Z}_p^*$, and the verification key which is an element $g^{sch.sk}$ of a group G may be generated based on the extracted element.

In addition, a random value a may be generated (or sampled), and a hashed value ppk=H'(α) for the random value may be generated. Here, a H' function may be $\{0,1\}^* \rightarrow p^k$, which is a function modeled using a random oracle, and $p^k$ may be a space of a public key of Public-key Cyptography (PKE).

In addition, the previously-generated signature key sch.sk may be used as a signature key BS.sk according to the disclosure, and the previously-generated verification key, random value, and hashed value may be used as the verification key BS.vk={sig.vk, α, ppk} according to the disclosure. As described above, the verification key may include not only the verification key used in the existing Schnorr scheme, but also the specific random value and hash value, and an apparatus that uses this method may thus perform a verification operation on the verification key.

Hereinafter, the description describes an operation of generating a digital signature. As described above, in the disclosure, in order to make a message secret, an apparatus (or user) that owns the message and an apparatus (or signer) that has the signature key may separately perform a signature operation. Accordingly, the description first describes an operation of the apparatus that owns the message.

First, the apparatus (or user) that owns the message may verify the verification key by using the public verification key BS.vk. In detail, the owner may verify whether the hashed value H'(α) for the random value α included in the verification key BS.vk and the random value ppk included in the verification key are the same as each other.

In addition, the owner may generate a homomorphic encryption secret key hsk and a homomorphic encryption public key hpk for homomorphic encryption. In detail, the owner may generate the above-mentioned homomorphic encryption secret key hsk and homomorphic encryption public key hpk by sampling a random value r and inputting the sampled random value r to a homomorphic encryption keygen algorithm.

In addition, the owner may generate a message ciphertext $ct_\mu$ by homomorphically encrypting a message μ by using the homomorphic encryption public key hpk.

In addition, the owner may generate a secret key ciphertext. In detail, the owner may calculate a random value $r_e$, and generate a secret key ciphertext $ct_{sk}$ by homomorphically encrypting the calculated random value $r_e$ by using the hashed value ppk and the homomorphic encryption secret key hsk.

In addition, the owner may generate verification information ask corresponding to the generated secret key ciphertext ctsk. Here, the verification information may satisfy the following equation.

$$(hsp, hsk) = FHE.KeyGen(1^\lambda; \rho) \wedge ct_{sk} = PKE.Enc(ppk, hsk; r_e) \quad \text{[Equation 2]}$$

In addition, the owner may transmit, to the signer, the generated information (e.g., homomorphic encryption public key hsk, secret key ciphertext $ct_{sk}$, secret key verification information $\pi_{sk}$, ciphertext $ct_{r_\mu}$ of first signature information, or message ciphertext $ct_\mu$.

Hereinafter, the description describes an operation of the signer (or a signature apparatus).

In case of receiving the above information, the signer may first verify the secret key ciphertext $ct_{sk}$ by using the received verification information $\pi_{sk}$.

In addition, the signer may then generate encrypted signature information $ct_\sigma$ by using a random element value π used in the Schnorr signature scheme, the received message ciphertext, or the like. In detail, the signer may generate the encrypted signature information by using the homomorphic encryption operation as shown in FIG. 5.

In addition, the signer may transmit the encrypted signature information $ct_\sigma$ to the user.

In addition, the user that receives the above information may generate the digital signature σ by restoring the encrypted signature information by using the homomorphic encryption secret key.

The signature information generated in this way may be used in a verification step using the verification key BS.vk.

Meanwhile, the description below describes a detailed principle of the zero-knowledge proof operation described above.

A variety of keys may be used in the homomorphic encryption operation. For example, a homomorphic encryption secret key s may be used to decrypt the ciphertext and generate the various public keys.

In addition, the homomorphic encryption public keys may include an encryption key enck, a rotation key rotk, a relinearization key rlk, and a bootstrapping key or recryption key reck. These keys may perform their original functions only in case of being normally made. In addition, a third party may perform an operation on a homomorphic ciphertext by using a maliciously generated key and then deliver the ciphertext to a secret key owner. In this case, additional information (e.g., a plaintext or an operation, used therein) used in an operation process may be leaked to the secret key owner.

Meanwhile, the same problem may occur in case that the homomorphic ciphertext is not encrypted using a normal encryption key. This problem may be considered important in that information on a party delegated to perform a computation may be leaked to a customer requesting the computation in a scenario of computation delegation which is a typical use of the homomorphic encryption.

In this respect, it may be the problem how to apply the existing zero-knowledge proof to the public key. In the disclosure, information on a computation process may not be leaked using an additional method in case that there are keys having a polynomial correlation among the public keys.

In detail, this relationship between the keys may be extended to a relationship between the homomorphic ciphertexts having the polynomial correlation. For example, the description describes a method using $reck = Enc_s(s)$, and $rlk = Enc_s(s^2)$. However, this method may also be applied to $Enc_s(m)$ and $Enc_s(f(m))$ or a pair of $Enc_{pk}(m)$ and $Enc_{pk}(f(m))$ encrypted using the public key in a polynomial f.

The zero-knowledge proof for the public key may be the zero-knowledge proof for a small secret key s∈R and small errors e, $e_{rotk,i}$, $e_{reck}$, $e_{rlk}$, $e_1$, $e_2$ ∈R, a one-time key r∈R, and a message m∈R, satisfying following expressions 1 through 5 for the given homomorphic encryption public key hpk= (enck, $(rotk_i)_{i \in I}$, reck, rlk)$\in R_Q^{2(|I|+3)}$ and homomorphic ciphertext ctxt=($c_0$, $c_1$). (Each operation may be an operation in $R_q$, and each key may be an element of $R^2$ (for example, enck=($enck_0$, $enck_1$)∈$R^2$).

$$enck_1 = -enck_0 \cdot s + 2e, \quad (1)$$

$$rlk_1 = -rlk_0 \cdot s + s^2 + 2e^{rlk}, \quad (2)$$

$$rotk_{i,1} = -rotk_{i,0} \cdot s + s(x^i) + 2e_{rotk,i} (\text{for all } i \in I), \quad (3)$$

$$c_0 = r \cdot enck_0 + e_1, \quad (4)$$

$$c_1 = r \cdot enck_1 + \Delta m + e_2. \quad (5)$$

$s = s_0 + s_1 x + \ldots + s_{n-1} x^{n-1}$, $e = e_0 + e_1 x + \ldots + e_{n-1} x^{n-1}$, $enck_0 = a_0 + \ldots + a_{n-1} x^{n-1}$, and $enck_1 = \beta_0 + \ldots + \beta_{n-1} x^{n-1}$. In this case, the first expression above may be expressed as follows.

$$\left(-\begin{pmatrix} \alpha_0 & 0 & 0 & 0 & 0 \\ \alpha_1 & \alpha_0 & 0 & 0 & 0 \\ \alpha_2 & \alpha_1 & \alpha_0 & 0 & 0 \\ \vdots & \vdots & \vdots & \ddots & 0 \\ \alpha_{n-1} & \alpha_{n-2} & \alpha_{n-3} & \cdots & \alpha_0 \end{pmatrix} - M \begin{pmatrix} 0 & \alpha_{n-1} & \alpha_{n-2} & \cdots & \alpha_1 \\ 0 & 0 & \alpha_{n-1} & \cdots & \alpha_2 \\ 0 & 0 & 0 & \ddots & \alpha_{n-2} \\ \vdots & \vdots & \vdots & \ddots & \alpha_{n-1} \\ 0 & 0 & 0 & \cdots & 0 \end{pmatrix} \middle| 2 \cdot Id \right) \cdot$$

$$\begin{pmatrix} s_0 \\ \vdots \\ s_{n-1} \\ e_0 \\ \vdots \\ e_{n-1} \end{pmatrix} = \begin{pmatrix} \beta_0 \\ \vdots \\ \beta_{n-1} \end{pmatrix} \bmod q$$

Here, $M=(M_{i,j}) \in (\mathbb{Z}_q)^{n \times (n-1)}$ is an $n \times (n-1)$ matrix that satisfies $x^{j+n-1} \bmod \phi_m(x) = \Sigma_{i=0}^{n-1} M_{i,j} x^i$. ($1 \le i \le n$, $1 \le j \le n-1$). Id is an identity matrix, and (|) may represent concatenation of two matrices.

The red matrix in the above expression may be $VtM(\overrightarrow{enck_0})$, and the above expression may then be expressed as $$A_1 \cdot \begin{pmatrix} \vec{s} \\ \vec{e} \end{pmatrix} = \overrightarrow{enck_1} \bmod q$$

for $A_1 = (-VtM(\overrightarrow{enck_0})|2 \cdot Id)$. Expressions 2 to 5 may also be similarly expressed.

$$A_1 = \left(-VtM(\overrightarrow{enck_0})|2 \cdot Id\right) \quad A_1 \cdot \begin{pmatrix} \vec{s} \\ \vec{e} \end{pmatrix} = \overrightarrow{enck_1} \bmod q$$

$$A_2 = \left(-VtM(\overrightarrow{rlk_0})|Id|2 \cdot Id\right) \quad A_2 \cdot \begin{pmatrix} \vec{s} \\ \vec{s^2} \\ \vec{e_{rlk}} \end{pmatrix} = \overrightarrow{rlk_1} \bmod q$$

$$A_3 = \left(-VtM(\overrightarrow{rotk_{i,0}}) + P_i|2 \cdot Id\right) \quad A_{3,i} \cdot \begin{pmatrix} \vec{s} \\ \vec{e_{rotk,i}} \end{pmatrix} = \overrightarrow{rotk_{i,1}} \bmod q$$

$$A_4 = \left(VtM(\overrightarrow{enck_0})|2 \cdot Id\right) \quad A_4 \cdot \begin{pmatrix} \vec{r} \\ \vec{e_1} \end{pmatrix} = \vec{c_0} \bmod q$$

$$A_5 = \left(VtM(\overrightarrow{enck_1})|2 \cdot Id\right) \quad A_5 \cdot \begin{pmatrix} r \\ \vec{e_2} \end{pmatrix} = \vec{c_1} \bmod q$$

$$P_i = (P_{i,j,k}) \in (\mathbb{Z}_q)^{n \times n} x^{ik} \bmod \phi_m(x) = \Sigma_{j=0}^{n-1} P_{i,j,k} x^j (1 \le i,j, k \le)$$

$$n) \begin{pmatrix} -VtM(\overrightarrow{enck_0}) & 2Id & 0 & 0 & 0 & 0 & \cdots & 0 & 0 \\ -VtM(\overrightarrow{rlk_0}) & 0 & Id & 2Id & 0 & 0 & \cdots & 0 & 0 \\ -VtM(\overrightarrow{rotk_{1,0}}) + P_1 & 0 & 0 & 0 & 2Id & 0 & \cdots & 0 & 0 \\ \vdots & \vdots & \vdots & \vdots & \vdots & \ddots & \vdots & \vdots \\ -VtM(\overrightarrow{rotk_{n,0}}) + P_n & & & & & \ddots & & \\ VtM(\overrightarrow{enck_0}) & 0 & 0 & 0 & 0 & \cdots & 2Id & 0 \\ VtM(\overrightarrow{enck_1}) & 0 & 0 & 0 & 0 & \cdots & 0 & 2Id \end{pmatrix} \begin{pmatrix} \vec{s} \\ \vec{e} \\ \vec{s^2} \\ \vec{e_{rlk}} \\ \vec{e_{rot,1}} \\ \vdots \\ \vec{e_{rot,n}} \\ \vec{e_1} \\ \vec{e_2} \end{pmatrix} =$$

$$\begin{pmatrix} \overrightarrow{enck_1} \\ \overrightarrow{rlk_1} \\ \overrightarrow{rotk_{1,1}} \\ \vdots \\ \overrightarrow{rotk_{n,1}} \\ \vec{c_0} \\ \vec{c_1} \end{pmatrix} \bmod q$$

However, $P_i$, i.e. is an $n \times n$ matrix that satisfies . . . . The above expression may be expressed as one expression below.

$$P_i = (P_{i,j,k}) \in (\mathbb{Z}_q)^{n \times n} x^{ik} \bmod \phi_m(x) = \Sigma_{j=0}^{n-1} P_{i,j,k} x^j (1 \le i,j, k \le)$$

$$\begin{pmatrix} \overrightarrow{enck_1} \\ \overrightarrow{rlk_1} \\ \overrightarrow{rotk_{1,1}} \\ \vdots \\ \overrightarrow{rotk_{n,1}} \\ \vec{c_0} \\ \vec{c_1} \end{pmatrix} \bmod q$$

Here, the zero-knowledge proof may be performed on this expression.

However, here, it is impossible to separately prove $s^2$ in the expression 2. Instead, it is only possible to prove that the expression 2 is a small polynomial.

To compensate for this problem, it is possible to prevent leakage of information on an owner of a circuit C by using the following method. Here, the circuit C' is a circuit that performs squaring operation.

| A (Message or Secret key owner) | B (Owner of circuit C) |
|---|---|
| Generate public key hpk, Generate ciphertext ctxt,<br>Generate zero-knowledge proof ZKP for public key/ciphertext, | |

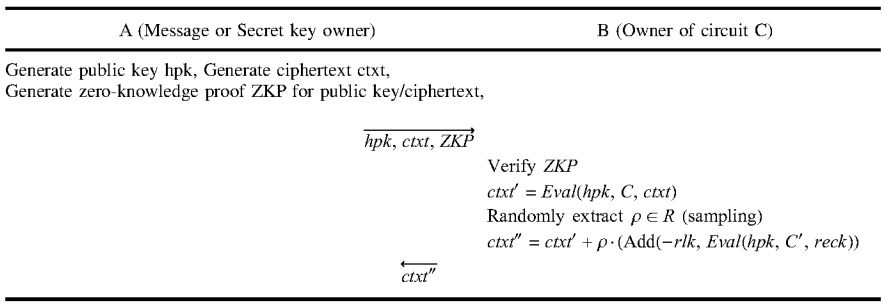

In detail, an owner having the message may generate the zero-knowledge proof for the public key/ciphertext; and the owner of the circuit C may verify the zero-knowledge proof, verify the received ciphertext by using an evaluation key, and calculate a new ciphertext value therefor.

The description above describes the method using $\text{reck}=\text{Enc}_s(s)$ and $\text{rlk}=\text{Enc}_s(s^2)$. However, this method may be applied to $\text{Enc}_s(m)$ and $\text{Enc}_s(f(m))$, or the pair of $\text{Enc}_{pk}(m)$ and $\text{Enc}_{pk}(f(m))$ encrypted using the public key in any polynomial f by using "C"=circuit of function f' The same method may be applied even to any circuit C'.

FIG. 6 is a view for explaining a method of generating a blind signature according to a second embodiment of the disclosure.

First, a setup operation is similar to that shown in FIG. 5, and the description thus omits a redundant description thereof.

Hereinafter, the description describes an operation of generating a digital signature. Unlike FIG. 5, FIG. 6 shows that an owner (or user) and a signer cooperate in a signature value generation process in a Schnorr digital signature to generate a signature value. In detail, FIG. 5 shows that only the signer generates signature information included in the digital signature, and the owner generates the digital signature only by decrypting the digital signature. However, in the disclosure here, the two apparatuses may respectively calculate values $(g^{k_s}, g^{k_u})$ corresponding to a value r among values included in the digital signature σ, and then finally reflect both the values.

First, the apparatus (or user) that owns the message may verify a verification key by using a public verification key BS.vk. In detail, the owner may verify whether a hashed value H'(α) for a random value α included in the verification key BS.vk and a random value ppk included in the verification key are the same as each other.

In addition, the owner may generate a homomorphic encryption secret key hsk and a homomorphic encryption public key hpk for the homomorphic encryption. In detail, the owner may generate the above-mentioned homomorphic encryption secret key hsk and homomorphic encryption public key hpk by sampling a random value ρ and inputting the sampled random value ρ to a homomorphic encryption keygen algorithm. Here, the homomorphic encryption keygen algorithm FHE.KeyGen may be an algorithm that receives a security parameter λ, and a daps boundary d, and generates the secret key and the public key that are used for the homomorphic encryption (or decryption).

In addition, the owner may generate a secret key ciphertext. In detail, the owner may calculate a random value $r_e$, and generate a secret key ciphertext $\text{ct}_{sk}$ by homomorphically encrypting the calculated random value $r_e$ by using the hashed value ppk and the homomorphic encryption secret key hsk.

In addition, the owner may generate a verification information $\pi_{sk}$ corresponding to the generated secret key ciphertext $\text{ct}_{sk}$. Here, the verification information may satisfy the following equation.

$$(hsp,hsk)=FHE.\text{KeyGen}(1^\lambda;\rho) \land \text{ct}_{sk}=\text{PKE}.\text{Enc}(ppk,hsk;r_e) \qquad \text{[Equation 3]}$$

In addition, a random element value $k_u$ used in a Schnorr signature scheme may be extracted from a set $\mathbb{Z}_p^*$, and an element value $r_u$ of a group G may be generated based on the extracted element $k_u$. Hereinafter, for ease of explanation, the element value $r_u$ is referred to as first signature information. Meanwhile, the element $k_u$ may be implemented to be referred to as the first signature information, and the element value $r_u$ may be implemented to be referred to as second signature information.

In addition, the ciphertext $\text{ct}_{r_u}$ and message ciphertext $\text{ct}_\mu$ of the first signature information may be respectively generated by homomorphically encrypting the first signature information $k_u$ by using the homomorphic encryption public key, and homomorphically encrypting the message by using the homomorphic encryption public key.

In addition, the verification information $\pi_{r_u}$ and $\pi_\mu$ may respectively be generated for the ciphertext $\text{ct}_{r_u}$ and message ciphertext $(\text{ct}_\mu)$ of the first signature information. Meanwhile, the verification information generation process described above may be implemented to be omitted in case that the apparatus that performs the signature does not perform a verification operation using the verification information which is information necessary to verify the ciphertext and message ciphertext of the first signature information. Meanwhile, FIG. 5 shows that three verification information are generated. However, the followings may be implemented to be generated: all three verification information, verification information for some of the three verification information, or integrated verification information for the three pieces of information.

In addition, the owner may transmit, to the signer, the generated information (e.g., homomorphic encryption public key hsk, secret key ciphertext $\text{ct}_{sk}$, secret key verification information $\pi_{sk}$, ciphertext $\text{ct}_{r_u}$ of the first signature information, message ciphertext $\text{ct}_\mu$, verification information $\pi_{r_u}$ on the first signature information, or message verification information $\pi_\mu$).

Hereinafter, the description describes an operation of the signer (or a signature apparatus).

In case of receiving the above information, the signer may first verify various information by using the received verification information.

In addition, the signer may extract a random element value $k_s$ used in the Schnorr signature scheme from the set $\mathbb{Z}_p^*$, and generate an element value $r_s$ of the group G based on the extracted element $k_s$. Hereinafter, for ease of explanation, the element value $r_s$ is referred to as the second signature information. Meanwhile, the extracted element $k_s$ may be implemented to be referred to as third signature information, and the element value $r_s$ may be implemented to be referred to as fourth signature information.

In addition, the signer may generate verification information $\pi_s$ on the above-mentioned second signature information.

In addition, the signer may generate encrypted signature information $ct_\sigma$. In detail, the signer may generate the encrypted signature information by using the homomorphic operation as shown in FIG. 5.

In addition, the signer may transmit, to the user, the encrypted signature information $ct_\sigma$, the second signature information $r_s$, and the verification information $\pi_s$ on the second signature information.

In addition, the user that receives the above information may verify the second signature information by using the received verification information. In case that the second signature information is verified, the user may generate third signature information r by using the first signature information and the second signature information, and generate fourth signature information s by decrypting the encrypted signature information by using the homomorphic encryption secret key.

In addition, the user may generate a digital signature σ by using the third signature information r and the fourth signature information s. Meanwhile, as shown in the drawing, the verification operation may be performed in advance by using the verification key before the digital signature is generated.

The signature information generated in this way may be used in a verification step using the verification key BS.vk.

FIG. 7 is a view for explaining a method of generating a blind signature according to a third embodiment of the disclosure.

First, a setup operation is similar to that shown in FIG. 5. However, this embodiment shown in FIG. 7 uses a key generation method of a division-free Schnorr scheme rather than a key generation method of a Schnorr scheme. Here, the division-free Schnorr scheme may use a group corresponding to a base point P on an Edward curve. A final signature key BS.sk=DFSsh.sk and a final verification key BS.vk={DFSch.vk, α, ppk} may be generated further using a random value and a hashed value in case that a signature key and a verification key are calculated using this scheme.

Hereinafter, the description describes an operation of generating a digital signature. Unlike the previous method shown in FIG. 6, an owner (or user) may further use $x_u$ and $y_u$. In detail, the embodiment shown in FIG. 6 extract the random element value $k_u$ from the set $\mathbb{Z}_p^*$, and used the extracted value as it is. However, the disclosure here uses a value obtained by decomposing $k_u$ into x and y axes.

Accordingly, this embodiment uses two encrypted information $ct_{xu}$ and $ct_{yu}$ unlike the embodiment shown in FIG. 6 that uses the first signature information as one information. This embodiment also uses two signature information for each information.

In addition, the owner may transmit, to the signer, the generated information (e.g., homomorphic encryption public key hsk, secret key ciphertext $ct_{sk}$, secret key verification information $\pi_{sk}$, ciphertext $ct_{xu}$ of the first signature information, message ciphertext $ct_\mu$, verification information $\pi_{xu}$ on the first signature information, verification information $\pi_{yu}$ on the second signature information, or message verification information $\pi_\mu$).

Hereinafter, the description describes an operation of the signer (or a signature apparatus).

In case of receiving the above information, the signer may first verify various information by using the received verification information.

In addition, the signer may extract a random element value $k_s$ used in a Schnorr signature scheme from a set $\mathbb{Z}_p^*$, and generate an element value $r_s$ of a group G based on the extracted element $k_s$. In addition, the singer may decompose the generated element value $r_s$ into three values $X_s$, $Y_s$, and $Z_s$ corresponding to a three-dimensional coordinate.

In addition, the signer may generate verification information $\pi_{ks}$ on the above-mentioned decomposed signature information.

In addition, the signer may generate encrypted signature information $ct_\sigma$. In detail, the signer may generate the encrypted signature information by using the homomorphic operation as shown in FIG. 7.

In addition, the signer may transmit, to the user, the encrypted signature information $ct_\sigma$, the decomposed signature information, and the verification information.

In addition, the user that receives the above information may verify the second signature information by using the received verification information. In case that the second signature information is verified, the user may generate third signature information r by using the first signature information Xu and Yu and the second signature information $X_s$, $Y_s$, and $Z_s$, and generate fourth signature information s by decrypting the encrypted signature information by using the homomorphic encryption secret key.

In addition, the user may generate the digital signature σ by using the third signature information r and the fourth signature information s. Meanwhile, as shown in the drawing, the verification operation may be performed in advance by using the verification key before the digital signature is generated.

The signature information generated in this way may be used in a verification step using the verification key BS.vk.

Meanwhile, the following technique may be used in a homomorphic ciphertext operation of the above process.

First, the description describes the homomorphic ciphertext operation on a large finite field using a small finite field operation.

BGV (or BFV)—based homomorphic encryption may basically have a finite field $GF(p^d)(=\mathbb{F}_{p^d})$ or a polynomial ring $((\mathbb{Z}_{p^r}[x]))/f(x)$ as a plaintext space, and support the operation thereon.

For example, a homomorphic encryption ring may be set to $R=\mathbb{Z}[x]/(\Phi_m(x))$ for natural number m in $ord_m(p)=k$, and in this case, the plaintext space may satisfy $$R_p = (\mathbb{Z}_p[x])/((\Phi_m(x))) \cong \bigoplus_{i=1}^{\ell} GF(p^k) \text{ for } \ell = \frac{\phi(m)}{k}.$$

That is, one homomorphic ciphertext may be considered as the following homomorphic encryption by having a vector having $GF(p^k)$ elements of $\ell$ as a message.

-message = $(f_0(x), f_1(x), \ldots, f_{\ell-1}(x)) \in \bigoplus_{i=1}^{\ell} GF(p^k)$ -$m(x) =$ $CRT$(message) $\in R_p$(That is, , $m(x) \equiv f_i(x) \bmod(p, F_i(x))$ is satisfied)

-$Enc_{s(x)}(m(x)) = \begin{cases} (a(x), -a(x)s(x) + \Delta m(x) + e(x))(BGV) \\ (a(x), -a(x)s(x) + m(x) + \Delta e(x))(BFV) \end{cases} \in R_q^2$ -continued $$-Dec_{s(x)}(ctxt = (a(x), b(x))) = \begin{cases} \left\lfloor \frac{b(x) + a(x)s(x)}{\Delta} \right\rceil & (BGV) \\ b(x) + a(x)s(x) \bmod \Delta & (BFV) \end{cases}$$

-Add $(ctxt_1, ctxt_2) = ctxt_1 + ctxt_2$

-CMult$(ctxt, m'(x) \in R) = ctxt \cdot m'$

-Mult$_{evk=(a_{evk}, b_{evk})}(ctxt_1 = (a_1, b_1), ctxt_2 = (a_2, b_2)) =$ $(a_1b_2 + a_2b_1, b_1b_2) + P^{-1}a_1a_2(a_{evk}, b_{evk})$ MatMult$_{evk}$(M, ctxt) may generate the homomorphic ciphertext having M message as a new message.

Here, $\Delta$, and p are appropriate positive integers, M is a matrix on the ring, M factored by $\Phi_m(x) = \prod_{i=0}^{\ell-1} F_i(x) \bmod p$, each polynomial $F_i(x)$ is an irreducible polynomial having a mod p, and may all have the same order k.

However, considering a parameter which may be bootstrapped and may be practically used, it is only possible to perform the operation on a small finite field such as GF(2) or have a limited plaintext such as $GF(2^{16})$, $GF(2^{24})$, $GF(2^{26})$, $GF(17^{40})$, or $GF(127^{26})$.

That is, it is possible to perform the operation only on a limited finite field. The disclosure aims to enable the homomorphic ciphertext operation on more diverse finite fields by compensating for this problem. In detail, all finite fields may be expressed in the form of GF $(p^d)$ for a prime number p and a positive integers d. If the integer d has a small divisor k of about 2 to 40, and an efficient finite field operation in GF $(p^k)$ is thus possible, the disclosure aims to extend this condition to a finite field operation on GF $(p^d)$.

In the above situation, the following equation is possible for $$r = \frac{d}{k}$$

and tor an irreducible polynomial F(y) of an r order whose coefficient includes an element of $GF(p^d) \cong GF(p^k)[y]/F(y)$. Therefore, the operation on a large finite field $(GF(p^d), +_{GF(p^d)}, \times_{GF(p^d)})$ may be performed by matching one or more homomorphic ciphertexts with a polynomial of an (r−1) order or less that has the element of GF $(p^k)$ as its coefficient.

For example, in case of $r^2 \leq \ell$, one homomorphic ciphertext may be matched with the following.
(Encryption)
message=$f_0(x)+f_1(x)y+f_2(x)y^2+ \ldots +f_{r-1}(x)y^{r-1} \in GF(p^k)$ [y]/F(y) may be defined as $m(x)=CRT(f_0(x), f_1(x), \ldots, f_{r-1}(x), 0, \ldots, 0))$, and the homomorphic ciphertext may be expressed as follows:

$Enc_{s(x)}^{GF(p^d)}(message)=Enc_{s(x)}(m(x))$.

(Decryption)
In case of defining $f_i(x)=(Dec_{s(x)}(ctxt)) \bmod (p, F_i(x))$ for a ciphertext ctxt, the decryption may be defined as follows:

$Dec_{s(x)}^{GF(p^d)}(ctxt)=f_0(x)f_1(x)y+f_2(x)$
$y^2+ \ldots +f_{r-1}(x)y^{r-1}$ Addition (on the Finite Field)
Add$^{GF(p^d)}$(ctxt$_1$, ctxt$_2$)Add$^{GF(p^d)}$(ctxt$_1$, ctxt$_2$)=Add(ctxt$_1$, ctxt$_2$)message$_1$, message$_2$GF$(p^d)$message$_1$, message$_2$A ciphertext defined as for two ciphertext ctxt$_1$, ctxt$_2$ obtained by encrypting elements of the finite field may be a ciphertext obtained by encrypting an addition result of the two finite field elements on the finite field.

Add$^{GF(p^d)}$(ctxt$_1$,ctxt$_2$)Add$^{GF(p^d)}$(ctxt$_1$,ctxt$_2$)=Add(ctxt$_1$,ctxt$_2$)message$_1$,message$_2$GF$(p^d)$message$_1$, message$_2$ That is, the following is possible for addition $+_{GF(p^d)}$ on the finite field:

$Dec_{s(x)}^{GF(p^d)}(Add^{GF(p^d)}(ctxt_1, ctxt_2))=message_1 +_{GF(p^d)} message_2$ Multiplication (on the Finite Field)
For the two ciphertexts ctxt$_1$, ctxt$_2$ obtained by encrypting the elements message$_1$, message$_2$ of the finite field GF$(p^d)$, the homomorphic finite field multiplication may be computed as follows:

-Input;

$-ctxt_1 =$ $Enc_{s(x)}^{GF(p^d)}(message_1 = f_0(x) + f_1(x)y + f_2(x)y^2 + \ldots + f_{r-1}(x)y^{r-1}) =$ $Enc_{s(x)}(CRT(f_0(x), f_1(x), \ldots, f_{r-1}(x), 0, \ldots, 0))$ $-ctxt_2 =$ $Enc_{s(x)}^{GF(p^d)}(message_2 = g_0(x) + g_1(x)y + g_2(x)y^2 + \ldots + g_{r-1}(x)y^{r-1}) =$ $Enc_{s(x)}(CRT(g_0(x), g_1(x), \ldots, g_{r-1}(x), 0, \ldots, 0))$ -Mult$_{evk}^{GF(p^d)}$(ctxt$_1$, ctxt$_2$), (Output:ctxt)

$-ctxt_1' = Add\left(ctxt_1, \sum_{i=1}^{r-1} rot_{evk}(ctxt_1, (r-1)i)\right) = Enc_{s(x)}$ $(CRT(f_0, f_1, \ldots, f_{r-1}, f_0, f_1, \ldots, f_{r-1}, \ldots, f_0, f_1, \ldots, f_{r-1}, 0, \ldots, 0))$ Here, $\Sigma$ is an iterative application of homomorphic encryption addition Add. As a result, $f_0, f_1, \ldots, f_{r-1}$ is copied to be repeated (r−1) times. The above method can also be calculated in a more efficient way as follows.

For $i = 1$ to $\lfloor \log_2(r) \rfloor$ $-ctxt_1 \leftarrow Add\left(ctxt_1, rot_{evk}\left(ctxt_1, 2^{\lfloor \log_2(r) \rfloor - i}\right)\right)$ $-ctxt_2' =$ $Add\left(CMult(ctxt_2, CRT(e_0)), \sum_{i=1}^{r-1} CMult(rot_{evk}(ctxt_2, i(r-i)), CRT(e_{ri})) =$ $\sum_{i=1}^{r-1} Enc_{s(x)}(CRT(0, \ldots, 0, g_i, 0, \ldots, 0))(g_i \text{ only for } ri-th) =$ $Enc_{s(x)}(CRT(g_0, 0, \ldots, 0, g_1, 0, \ldots, 0, g_2, 0, \ldots, 0, \ldots, g_{r-1}, 0, \ldots, 0))$ $-ctxt_2'' = Add\left(ctxt_2', \sum_{i=1}^{r-1} rot_{evk}(ctxt_2', i)\right) = Enc_{s(x)}$ $(CRT(g_0, g_0, \ldots, g_0, g_1, g_1, \ldots, g_1, \ldots, g_{r-1}, g_{r-1}, \ldots, g_{r-1}, 0, \ldots, 0))$ Here, $g_i$ is the iterative application of the homomorphic encryption addition Add. $e_{ri}$ is a vector of a length l, where only the ri-th element is 1 and the rest are zero. As a result, each $g_i$ is copied to be repeated (r−1) times. The last computation of ctxt$_2$" may be done as efficiently as the computation of ctxt$_1$' The binary representation of r may be $r=\Sigma_{i \in I} 2^i$. Here, $-ctxt_2^0 = ctxt_2', ctxt_2'' = 0, j = 0$ -For $i = 1$ to $\lfloor \log_2(r) \rfloor$ $-ctxt_2^i \leftarrow Add\left(ctxt_2^{i-1}, rot_{evk}(ctxt_2^{i-1}, 2^{i-1})\right)$ -continued -For $i$ in $I$(descending order)

$-ctxt_2'' = \text{Add}\left(ctxt_2'', rot_{evk}\left(\sum_{i \in I} ctxt_2^i, j\right)\right)$ $-j = j + 2^i$ $-ctxt' = Mult_{evk}(ctxt_1', ctxt_2'')$ $-ctxt' = \text{Add}\left(ctxt', \sum_{i=1}^{r-1} rot_{evk}(ctxt', -(r-1)i)\right) =$ $Enc_{s(x)}(CRT(h_0, h_1, \ldots, h_{2r-2}, 0, \ldots, 0))$ Here, $h_i = \sum_{j+k=i} f_j g_k$ $-ctxt_a = CMult(ctxt', CRT(1, 1, \ldots, 1, 0, \ldots, 0))(1 \text{ is } r) =$ $Enc_{s(x)}(CRT(h_0, h_1, \ldots, h_{r-1}, 0, \ldots, 0))$ $-ctxt_b = CMult(rot_{evk}(ctxt', -r), CRT(1, 1, \ldots, 1, 0, \ldots, 0))(1 \text{ is } r-1) =$ $Enc_{s(x)}(CRT(h_r, h_{r+1}, \ldots, h_{2r-2}, 0, \ldots, 0))$ $-ctxt = -\text{Add}(ctxt_a, MatMult_{evk}(M, ctxt_b))$ Here, $M=(M_{i,j}) \in (GF(p^k))^{r \times (r-1)}$ is a constant matrix that satisfies $y^{j+r-1} \mod F(y) = \sum_{i=0}^{r-1} M_{i,j} y^i$ with a matrix $r \times (r-1)$ ($1 \leq i \leq r$, $1 \leq j \leq r-1$).

Therefore, the operation on the large finite field $(GF(p^d), +_{GF(p^d)}, \times_{GF(p^d)})$ may be performed for the ciphertext made through the above encryption/decryption process through the above two homomorphic operations. A case of $r^2 > \ell \geq r$ may also use a method in which one large finite field element is encrypted in one ciphertext, and several ciphertexts are used only for the homomorphic finite field multiplication.

Similarly, in a case of $r > \ell$, one large finite field element may be encrypted in several ciphertexts.

The description is provided with a focus on the following: In case of using the above scheme, a "large finite field homomorphic operation capable of the bootstrapping," which is impossible in the existing BGV or BFV-based homomorphic encryption, is made possible through a "small finite field operation capable of the bootstrapping." Meanwhile, the above-described operation may be implemented to be applied in reverse, that is, may be applied to a scheme that performs a large finite field operation for the efficient homomorphic encryption in a small finite field.

In addition, the description describes the rest operations on the homomorphic ciphertext.

The BGV (or BFV)-based homomorphic encryption may basically have the finite field $GF(p^d)(=\mathbb{F}_{p^d})$ or the polynomial ring $((\mathbb{Z}_{p^r}[x])/f(x)$ as the plaintext space, and support the operation thereon.

In particular, in the case of having the plaintext space as the polynomial ring, the plaintext space may be limited to $\mathbb{Z}_{p^r}$ by inserting message information only in a constant term of the polynomial. In case of using this scheme, it is also possible to perform an integer operation by using a p-base number system.

For example, the operation in a case of r=1 and p=2 may be the same as a bit operation. The integer addition operation or multiplication operation may be implemented using the full adder or half adder of the bit operation. In case of using this scheme, it is possible to apply the above concept to a p-base adder. Meanwhile, it is also possible to simply perform an operation of dividing by p by shifting digits. However, it is not easy to apply this scheme to the rest operations, that is, to a modulo (or a mod q) operation, excluding a case of q=p.

u mod q for p-base numbers $u = u_{k-1}u_{k-2} \ldots u_1 u_0$ and $q \leq p^k$ may be obtained as follows: (Here, $\lambda$ is a moderately large natural number).

$-\hat{q} = \lfloor p^{k+\lambda}/q \rfloor$ $-u - \left\lfloor \dfrac{u \times \hat{q}}{p^{k+\lambda}} \right\rfloor = \begin{cases} u \bmod q & \text{with probability} \geq 1 - 2 \cdot p^{-\lambda} \\ u \bmod q + q & \text{with probability} \leq p^{-\lambda} \\ u \bmod q - q & \text{with probability} \leq p^{-\lambda} \end{cases}$ This result may be confirmed through the following equation:

$\left| \dfrac{1}{q} - \dfrac{\hat{q}}{p^{k+\lambda}} \right| \leq \dfrac{1}{p^{k+\lambda}} \Rightarrow \left\lfloor \dfrac{u \times \hat{q}}{p^{k+\lambda}} \right\rfloor = \left\lfloor \dfrac{u}{q} + \epsilon \right\rfloor (\text{Here, } |\epsilon| \leq p^{-\lambda}).$ $\Rightarrow u - \left\lfloor \dfrac{u \times \hat{q}}{p^{k+\lambda}} \right\rfloor \times q = u - \left\lfloor \dfrac{u}{q} \right\rfloor \times q \text{ with probabilty} \geq 1 - 2 \cdot p^{-\lambda}.$ Based on this fact, it is possible to consider the mod q operation in the homomorphic encryption in which the plaintext space is $\mathbb{Z}_p$ as follows. For convenience, the description assumes only a case of q, $\hat{q} < p^k$.

Each digit of the p-base number $u = u_0 u_1 \ldots u_{k-1}$ may be encrypted into each slot, that is, $ctxt = Enc_{s(x)}(CRT(u_0, u_1, \ldots, u_{k-1}, 0, \ldots, 0))$ and $ptxt_{\hat{q}} = CRT(\hat{q}_0, \hat{q}_1, 0, \ldots, 0)$ $ptxt_q = CRT(q_0, q_1, \ldots, q_{k-1}, 0, \ldots, 0)$.

It is possible to compute $Adder_p$, which is the p-base adder, and $Multiplier_p$, which is a p-base multiplier implemented using $Adder_p$, through the following:

$ctxt' = multiplier_p(ctxt, ptxt_{\hat{q}})$, $ctxt' = rot_{evk}(CMult(ctxt', CRT(0, \ldots, 0, 1, \ldots, 1)), -k-\lambda)(0 = k + \text{the number of } \lambda)$, $ctxt' = ctxt - multiplier_p(ctxt', ptxt_q)$ The computation may have a ciphertext of u mod q as a result with a very high probability, based on a selected $\lambda$ value, and also have a $\pm q$ value with a low probability.

The description above describes only the case where one digit is put into each slot of one ciphertext. However, this scheme may be equally applicable to cases such as dividing the digits across several ciphertexts, or matching one digit with one ciphertext.

Figure 8:
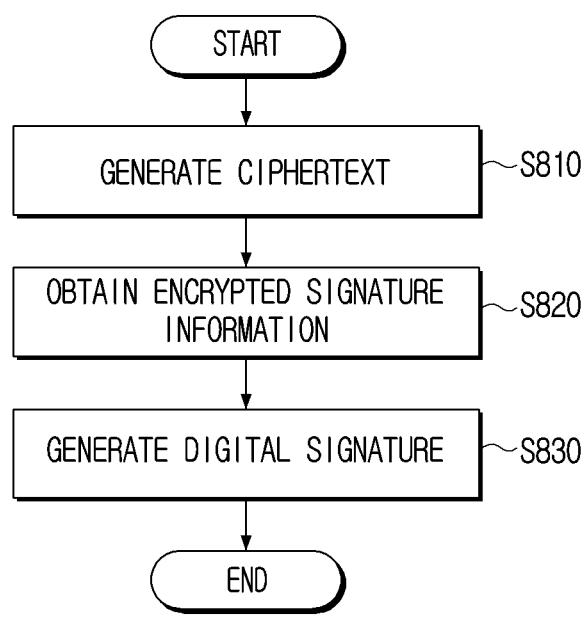
FIG. 8 is a view for explaining a method of generating a digital signature according to a first embodiment of the disclosure.

FIG. 8 is a view for explaining a method of generating a digital signature according to a first embodiment of the disclosure.

Referring to FIG. 8, a first signature ciphertext and a message ciphertext may be generated by encrypting each of first signature information and a message by using a homomorphic encryption public key (S810).

It is then possible to obtain encrypted third signature information generated using second signature information, an element value corresponding to the second signature information, the first signature ciphertext, and the message ciphertext (S820). In detail, encrypted signature information may be obtained by transmitting the first signature ciphertext and the message ciphertext to an external apparatus having a signature key for the digital signature, and receiving the second signature information and the encrypted third signature information from the external apparatus. Here, for verification of the transmitted information, it is possible to transmit verification information (e.g., first signature verification information, message verification information, or secret key verification information) corresponding to the above-mentioned ciphertext message together.

It is then possible to calculate a first digital signature value included in the digital signature by using the first signature information and the second signature information, calculate a second digital signature value included in the digital signature by decrypting the encrypted third signature information, and generate the digital signature by using the calculated first digital signature value and second digital signature value (S830). In detail, the first signature information may be information $g^{ku}$ calculated using an element value $k_u$ randomly extracted from a set $\mathbb{Z}_p^*$, by an electronic apparatus, and the second signature information may be information $g^{ks}$ calculated using an element value $k_s$, randomly extracted from the set $\mathbb{Z}_p^*$, by the external apparatus. Accordingly, the first digital signature value may be calculated by multiplying the first signature information $g^{ku}$ and the second signature information $g^{ks}$, and the second digital signature value may be calculated (or generated) by decrypting the encrypted third signature information by using a homomorphic encryption secret key corresponding to the homomorphic encryption public key. Here, a second digital signature value $k_u+s$ may be calculated by adding decrypted third signature information s and the extracted element value $k_u$.

Figure 9:
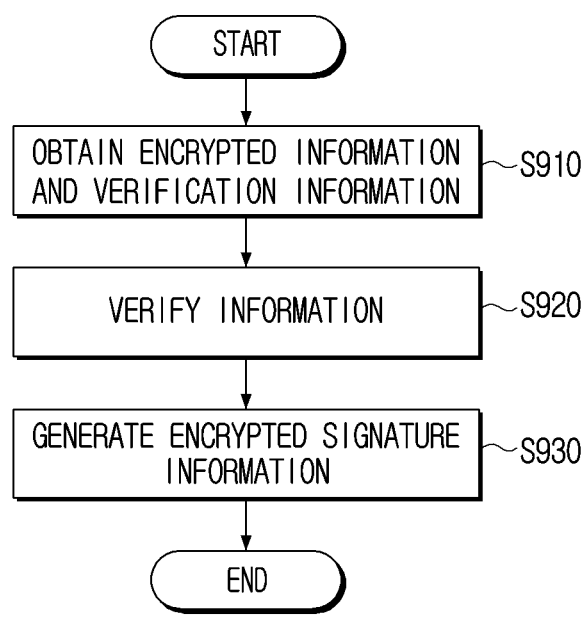
FIG. 9 is a view for explaining a method of generating a digital signature according to a second embodiment of the disclosure.

FIG. 9 is a view for explaining a method of generating a digital signature according to a second embodiment of the disclosure.

Referring to FIG. 9, it is possible to receive encrypted information and verification information corresponding to each information (S910).

The encrypted information may be verified using the received verification information (S920).

In case that the verification is complete, encrypted signature information may be generated using the received encrypted information and a signature key of the digital signature (S930).

It is then possible to transmit the generated encrypted signature information and the signature information used to generate the signature information to an apparatus (i.e., user) that transmitting the encrypted information.

Figure 10:
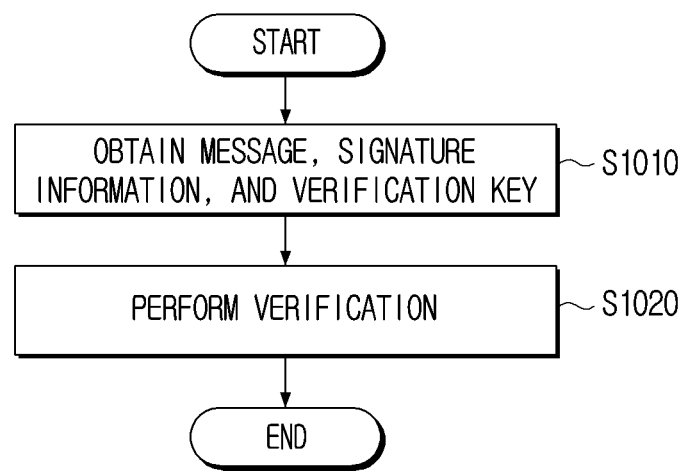
FIG. 10 is a view for explaining a method of verifying a digital signature according to the disclosure.

FIG. 10 is a view for explaining a method of verifying a digital signature according to the disclosure.

Referring to FIG. 10, it is possible to secure a message, signature information, and a verification key (S1010).

In case that the three information are secured in this way, it is possible to verify whether the message is forged and falsified using the verification algorithm as described above (S1020).

The methods of generating and controlling the digital signature as described above may be used not only for execution results of various applications, but also for collection of various types of credit information or personal information directly input by the user.

Meanwhile, the methods of generating and controlling the digital signature according to the various embodiments described above may be implemented in the form of program codes for performing the respective steps, stored in a recording medium, and then distributed. In this case, an apparatus in which the recording medium is mounted may perform the operations such as the encryption or the ciphertext processing described above.

The recording media may be various types of computer-readable media such as a read only memory (ROM), a random access memory (RAM), a memory chip, a memory card, an external hard drive, a hard drive, a compact disk (CD), a digital versatile disk (DVD), a magnetic disk and a magnetic tape.

Although the disclosure has been described with reference to the accompanying drawings, the scope of the disclosure is determined by the claims described below and should not be construed as being limited to the above-described embodiments or drawings. In addition, it should be clearly understood that improvements, changes, and modifications obvious to those skilled in the art of the disclosure described in the claims are also included in the scope of the disclosure.

What is claimed is:

1. A method of generating a digital signature, the method comprising:
   generating a first signature ciphertext and a message ciphertext by encrypting each of first signature information and a message by using a homomorphic encryption public key,
   obtaining encrypted third signature information generated using second signature information, an element value corresponding to the second signature information, the first signature ciphertext, and the message ciphertext, and
   calculating a first digital signature value included in the digital signature by using the first signature information and the second signature information, calculating a second digital signature value included in the digital signature by decrypting the encrypted third signature information, and generating the digital signature by using the calculated first digital signature value and second digital signature value.

2. The method as claimed in claim 1, wherein in the obtaining of the signature information,
   the first signature ciphertext and the message ciphertext are transmitted to an external apparatus having a signature key for the digital signature, and
   the second signature information and the encrypted third signature information are received from the external apparatus.

3. The method as claimed in claim 2, further comprising generating first signature verification information corresponding to the first signature information and message verification information corresponding to the message ciphertext,
   wherein in the obtaining of the signature information, the first signature ciphertext, the message ciphertext, the first signature verification information, and the message verification information are transmitted to the external apparatus.

4. The method as claimed in claim 2, further comprising:
   generating a secret key ciphertext by extracting a random value, and encrypting the extracted random value by using a homomorphic encryption secret key corresponding to the homomorphic encryption public key, and
   generating secret key verification information corresponding to the secret key ciphertext,
   wherein in the obtaining of the signature information, the secret key ciphertext and the secret key verification information are further transmitted.

5. The method as claimed in claim 4, wherein the signature key includes the signature information, the random value of the signature, and a hashed value obtained by hashing the random value of the signature, and the secret key ciphertext is obtained by encrypting the extracted random value by using the hashed value and the homomorphic encryption secret key.

6. The method as claimed in claim 5, wherein the signature key is an element value sch.sk randomly extracted from a set $\mathbb{Z}_p^*$, and a verification key includes an element value $g^{sch.sk}$ of a group G, the random value of the signature, and the hashed value, based on the extracted element sch.sk.

7. The method as claimed in claim 1, wherein the first signature information is information $g^{ku}$ calculated using an element value $k_u$ randomly extracted from a set $\mathbb{Z}_p^*$ by an electronic apparatus, the second signature information is information $g^{ks}$ calculated using an element value $k_s$ randomly extracted from the set $\mathbb{Z}_p^*$ by an external apparatus, and in the generating of the digital signature, the first digital signature value is calculated by multiplying the first signature information $g^{ku}$ and the second signature information $g^{ks}$, and the second digital signature value is calculated by decrypting the encrypted third signature information by using a homomorphic encryption secret key corresponding to the homomorphic encryption public key.

8. The method as claimed in claim 7, wherein in the generating of the digital signature, a second digital signature value $k_u+s$ is calculated by adding decrypted third signature information s and the extracted element value $k_u$.

9. The method as claimed in claim 1, further comprising randomly extracting an element value $k_u$ from a set $\mathbb{Z}_p$, generating a first element value $x_u$ and a second element value $y_u$, obtained by decomposing the element value, and generating a first ciphertext for the first element value and a second ciphertext for the second element value.

10. An electronic apparatus comprising:
a communication apparatus configured to communicate with an external apparatus;
a memory storing a message; and
a processor configured to generate a digital signature for the message,
wherein the processor is configured to
generate a first signature ciphertext and a message ciphertext by encrypting each of first signature information and the message by using a homomorphic encryption public key,
obtain encrypted third signature information generated using second signature information, an element value corresponding to the second signature information, the first signature ciphertext, and the message ciphertext, and
calculate a first digital signature value included in the digital signature by using the first signature information and the second signature information, calculate a second digital signature value included in the digital signature by decrypting the encrypted third signature information, and generate the digital signature by using the calculated first digital signature value and second digital signature value.

11. The apparatus as claimed in claim 10, wherein the processor is configured to control the communication apparatus to transmit the first signature ciphertext and the message ciphertext to the external apparatus having a signature key for the digital signature, and the communication apparatus is configured to receive the second signature information and the encrypted third signature information from the external apparatus.

12. The apparatus as claimed in claim 11, wherein the processor is configured to generate first signature verification information corresponding to the first signature information and message verification information corresponding to the message ciphertext, and control the communication apparatus to transmit, to the external apparatus, the first signature ciphertext, the message ciphertext, the first signature verification information, and the message verification information.

13. The apparatus as claimed in claim 11, wherein the processor is configured to generate a secret key ciphertext by extracting a random value, and encrypting the extracted random value by using a homomorphic encryption secret key corresponding to the homomorphic encryption public key, generate secret key verification information corresponding to the secret key ciphertext, and control the communication apparatus to further transmit the secret key ciphertext and the secret key verification information.

14. The apparatus as claimed in claim 13, wherein the signature key includes the signature information, the random value of the signature, and a hashed value obtained by hashing the random value of the signature, and the secret key ciphertext is obtained by encrypting the extracted random value by using the hashed value and the homomorphic encryption secret key.

15. A non-transitory computer-readable recording medium which stores a program for executing a method of generating a digital signature, wherein the method includes:

generating a first signature ciphertext and a message ciphertext by encrypting each of first signature information and a message by using a homomorphic encryption public key, obtaining encrypted third signature information generated using second signature information, an element value corresponding to the second signature information, the first signature ciphertext, and the message ciphertext, and calculating a first digital signature value included in the digital signature by using the first signature information and the second signature information, calculating a second digital signature value included in the digital signature by decrypting the encrypted third signature information, and generating the digital signature by using the calculated first digital signature value and second digital signature value.

* * * * *